(12) United States Patent
Lee et al.

(10) Patent No.: US 12,167,111 B2
(45) Date of Patent: Dec. 10, 2024

(54) CAMERA MODULE INCLUDING AN OPTICAL MEMBER

(71) Applicant: LG INNOTEK CO., LTD., Seoul (KR)

(72) Inventors: Hee Se Lee, Seoul (KR); Tae Gon Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/796,072

(22) PCT Filed: Jan. 29, 2021

(86) PCT No.: PCT/KR2021/001244
§ 371 (c)(1),
(2) Date: Jul. 28, 2022

(87) PCT Pub. No.: WO2021/154049
PCT Pub. Date: Aug. 5, 2021

(65) Prior Publication Data
US 2023/0064678 A1  Mar. 2, 2023

(30) Foreign Application Priority Data

Jan. 29, 2020 (KR) ........................ 10-2020-0010338

(51) Int. Cl.
*H04N 23/51* (2023.01)
*H04N 23/56* (2023.01)
(52) U.S. Cl.
CPC ............. *H04N 23/51* (2023.01); *H04N 23/56* (2023.01)

(58) Field of Classification Search
CPC ........ H04N 23/51; H04N 23/56; H04N 23/54; H04N 23/57; H04N 23/957
See application file for complete search history.

(56) References Cited

U.S. PATENT DOCUMENTS

| 10,397,457 B2* | 8/2019 | Ho .......................... H04N 23/57 |
| 2002/0119658 A1* | 8/2002 | Honda ................ H01L 31/0203 |
| | | 257/E31.118 |
| 2004/0132491 A1* | 7/2004 | Kim ....................... H04N 23/55 |
| | | 348/E5.025 |
| 2011/0134303 A1 | 6/2011 | Jung et al. |
| 2012/0223233 A1 | 9/2012 | Tang et al. |
| 2017/0041521 A1 | 2/2017 | Han |
| 2020/0003870 A1 | 1/2020 | Chen et al. |

(Continued)

FOREIGN PATENT DOCUMENTS

| CN | 107870186 A | 4/2018 |
| KR | 10-2011-0064156 A | 6/2011 |
| KR | 10-2011-0127922 A | 11/2011 |

(Continued)

*Primary Examiner* — Ahmed A Berhan
(74) *Attorney, Agent, or Firm* — Birch, Stewart, Kolasch & Birch, LLP

(57) ABSTRACT

A camera module according to an embodiment of the present invention comprises: a circuit board; a light source and an image sensor arranged on the circuit board; a housing arranged on the circuit board; an optical member arranged on the light source and including an electrode; and a conductive portion which is arranged in the housing and electrically connects the electrode of the optical member to the circuit board.

20 Claims, 11 Drawing Sheets

(56) References Cited

U.S. PATENT DOCUMENTS

2020/0041875 A1 2/2020 Choi
2021/0048563 A1 2/2021 Kim

FOREIGN PATENT DOCUMENTS

| KR | 10-1677523 B1 | 11/2016 |
| KR | 10-2018-0110796 A | 10/2018 |
| KR | 10-2019-0091719 A | 8/2019 |

* cited by examiner

[FIG. 1]
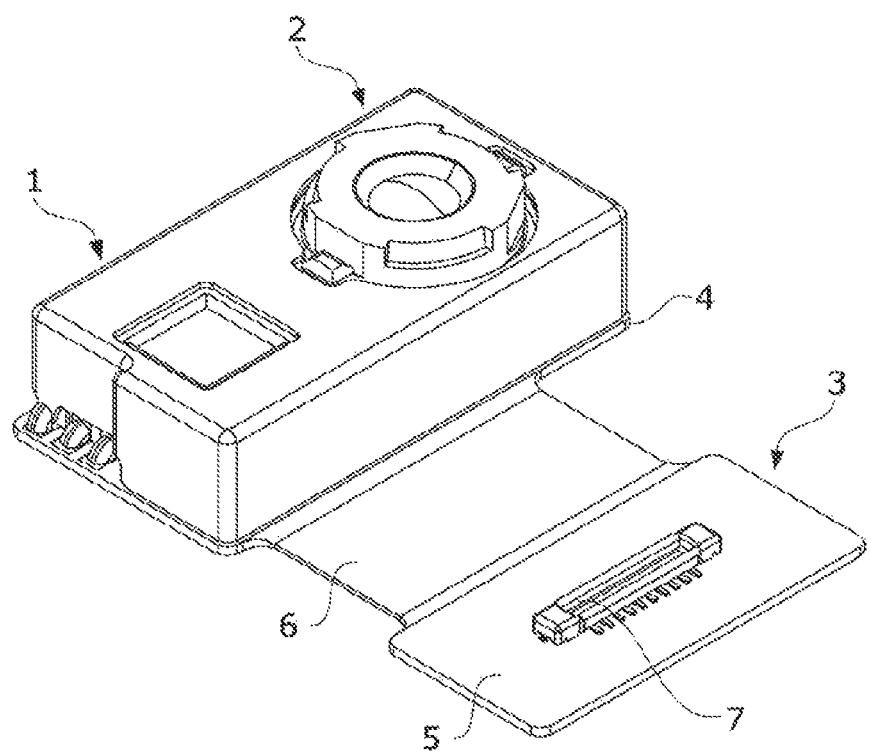

[FIG. 2]
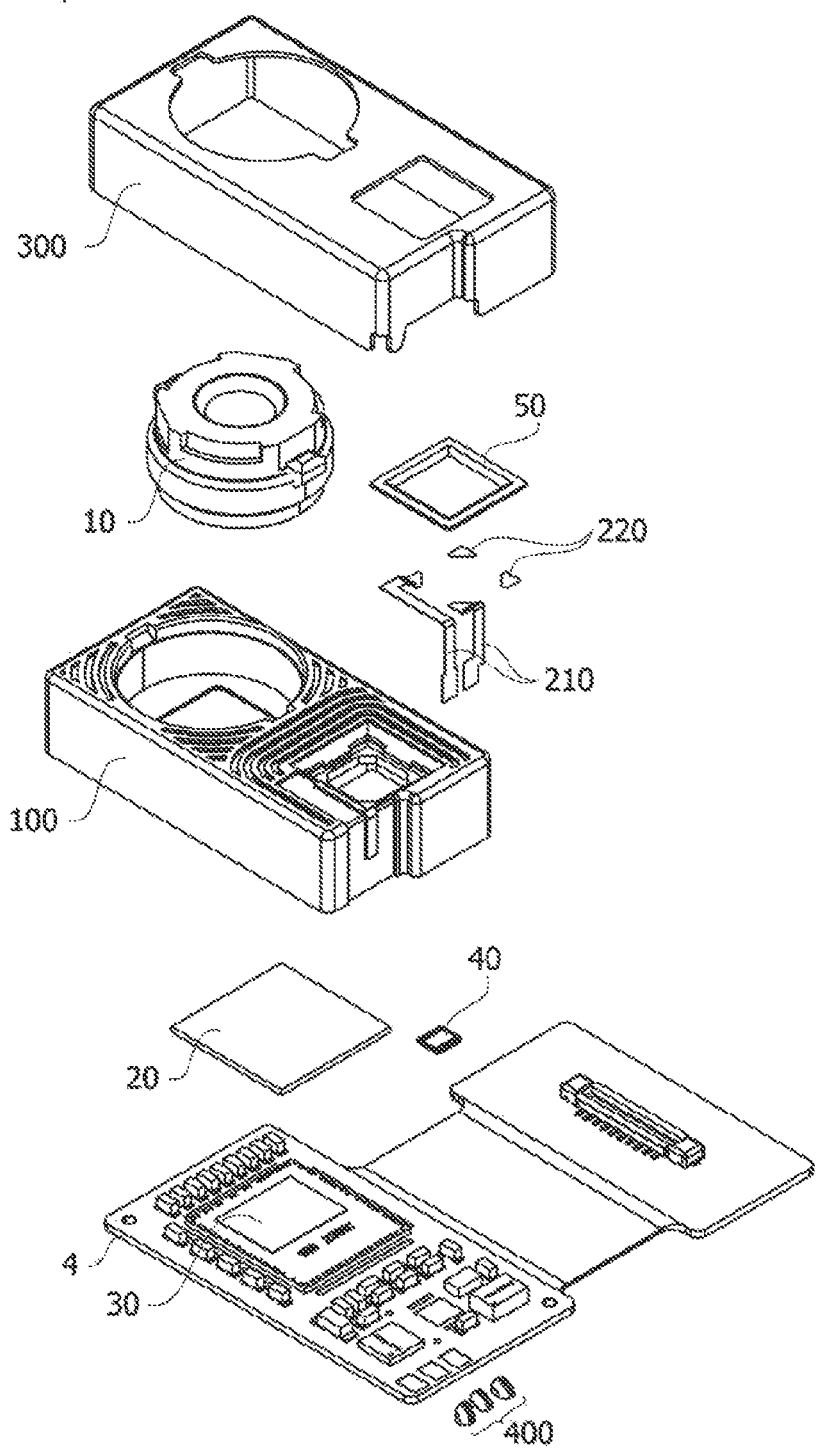

[FIG. 3]
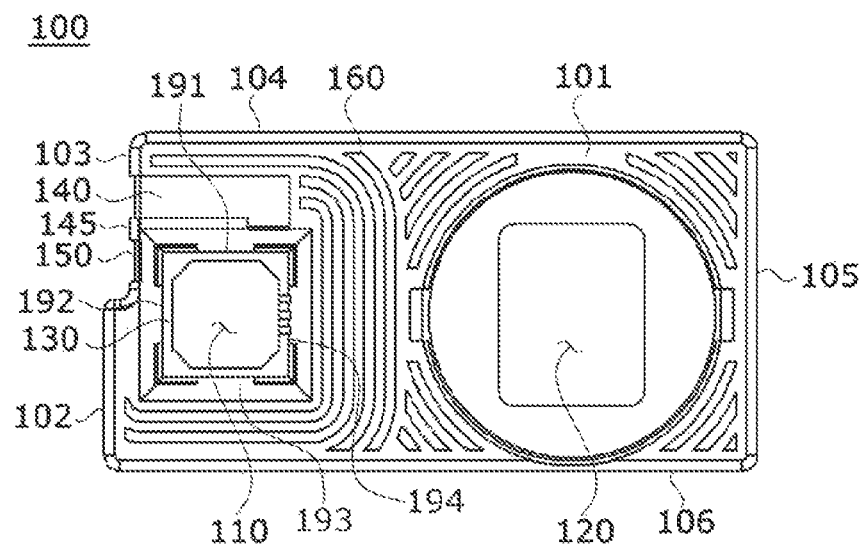
[FIG. 4]
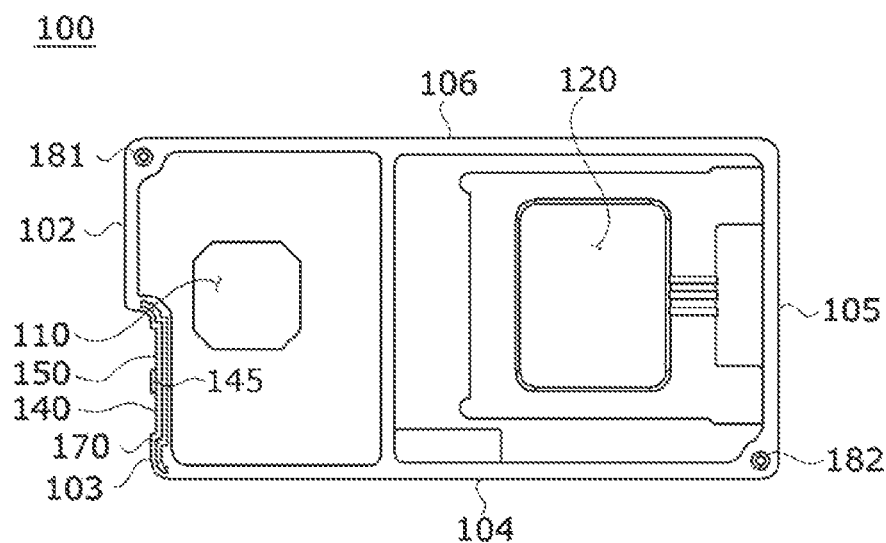

[FIG. 5]
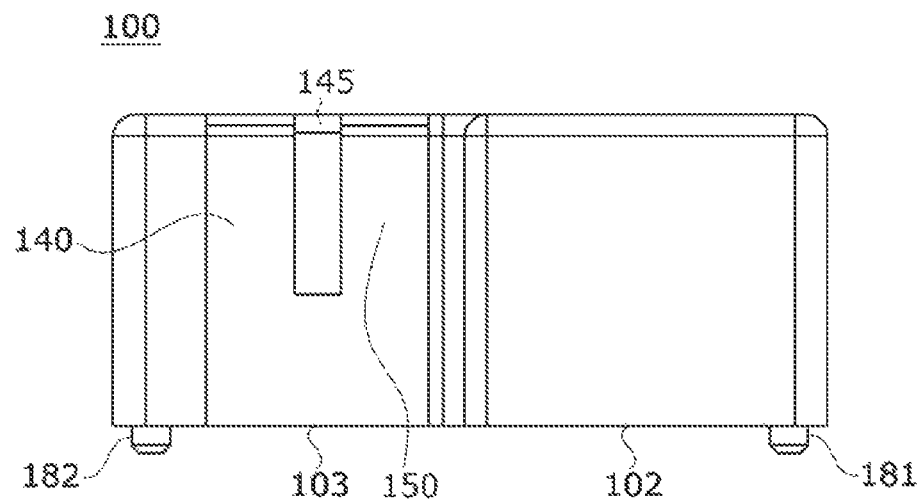
[FIG. 6]
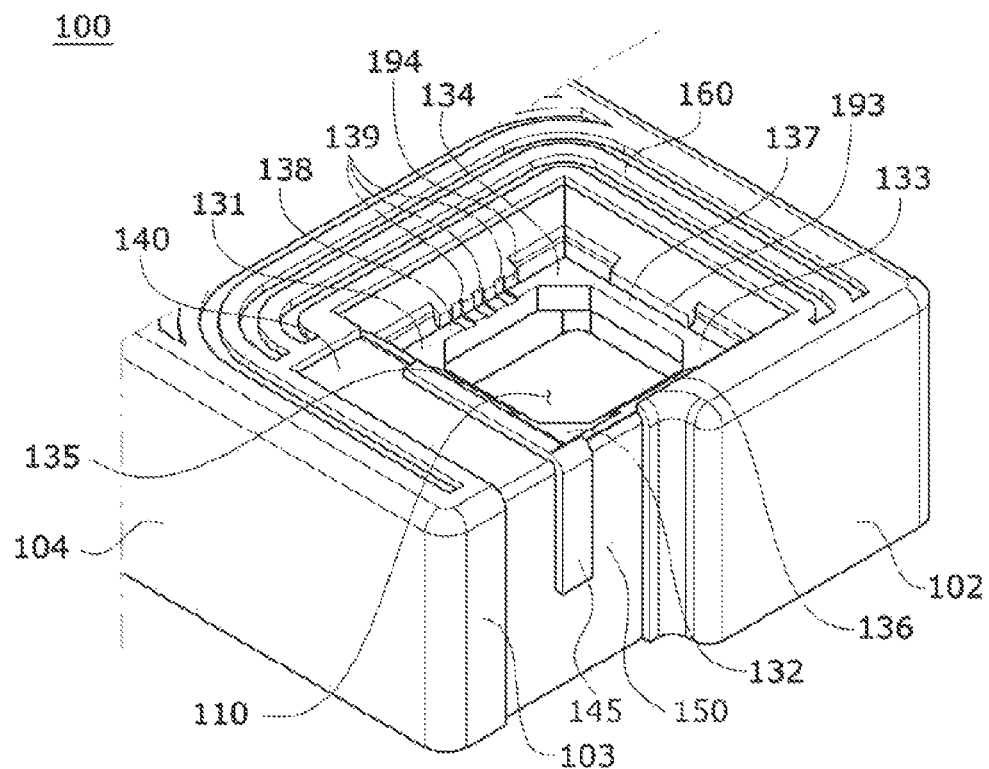

[FIG. 7]
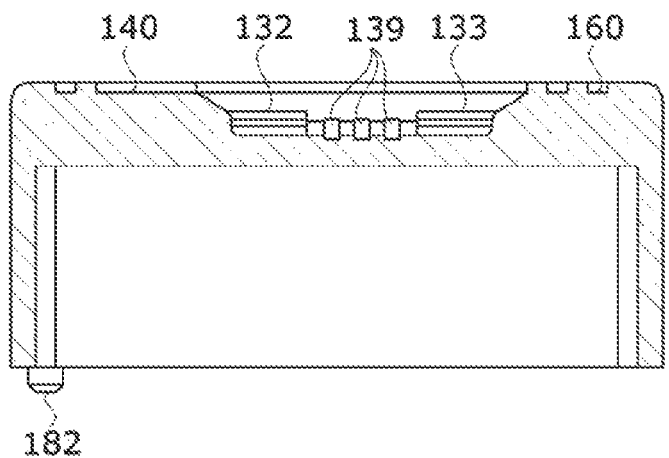
[FIG. 8]
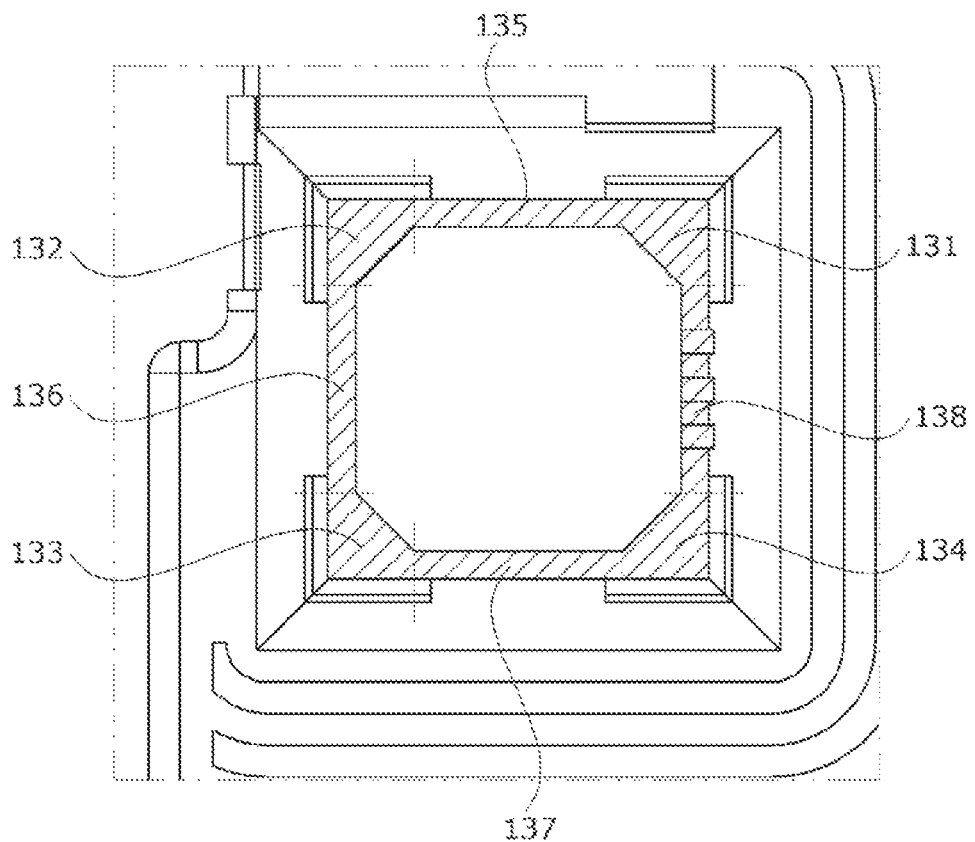

[FIG. 9]
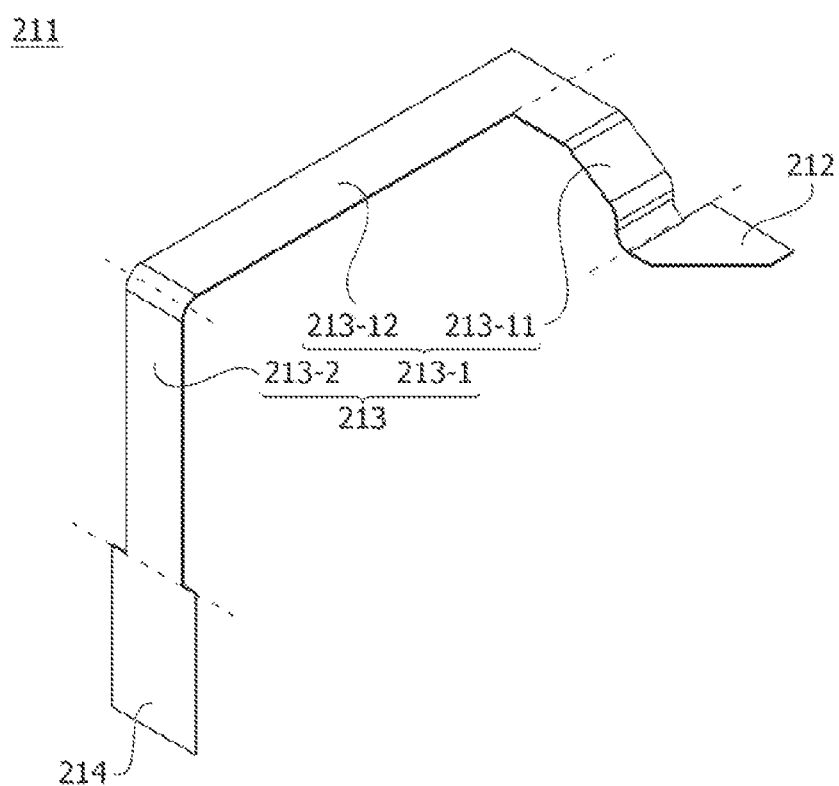

[FIG. 10]
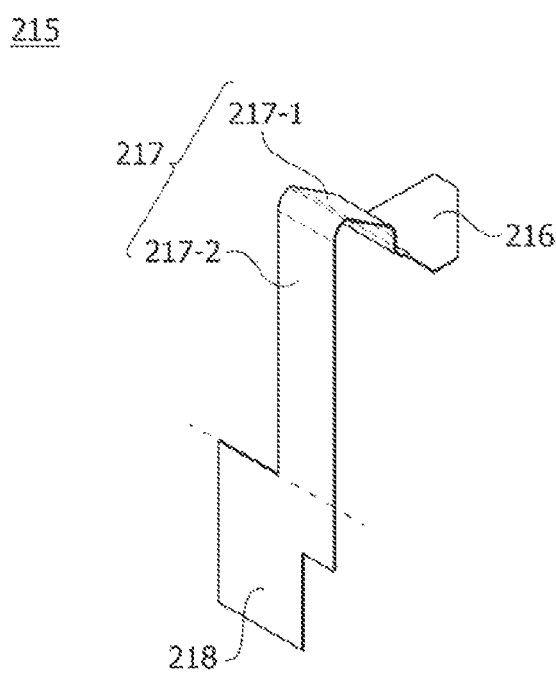

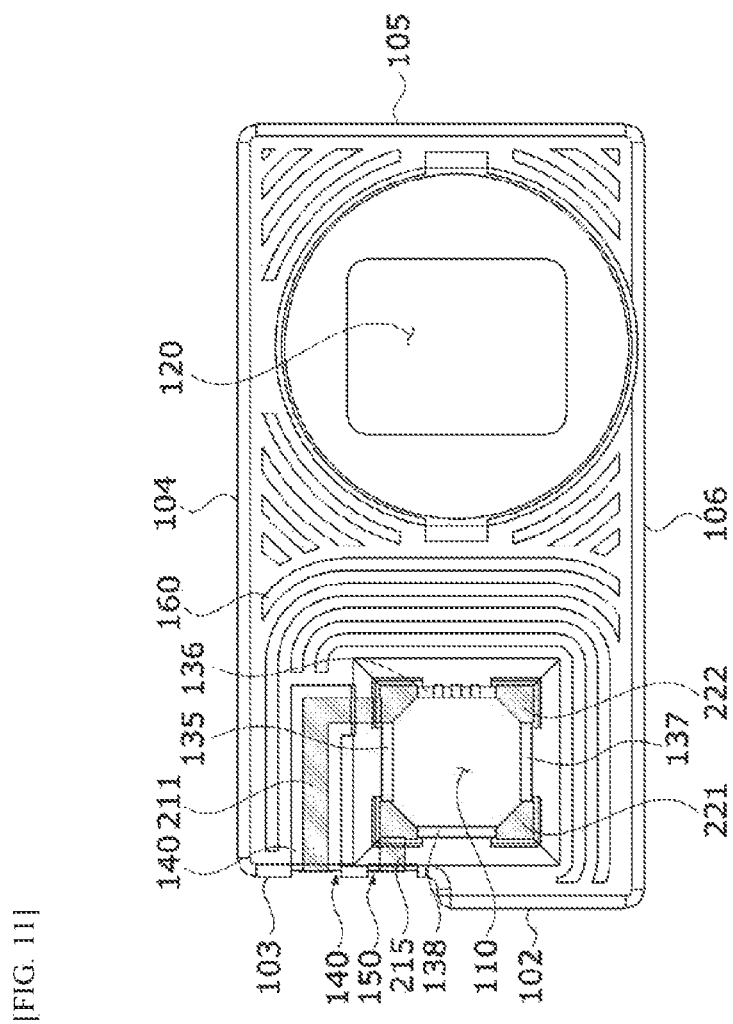
[FIG. 11]

[FIG. 12]
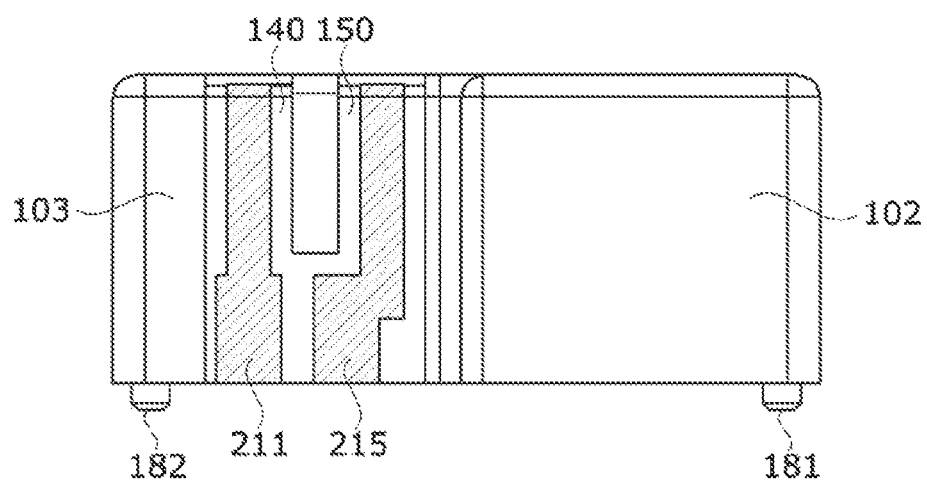

[FIG. 13]
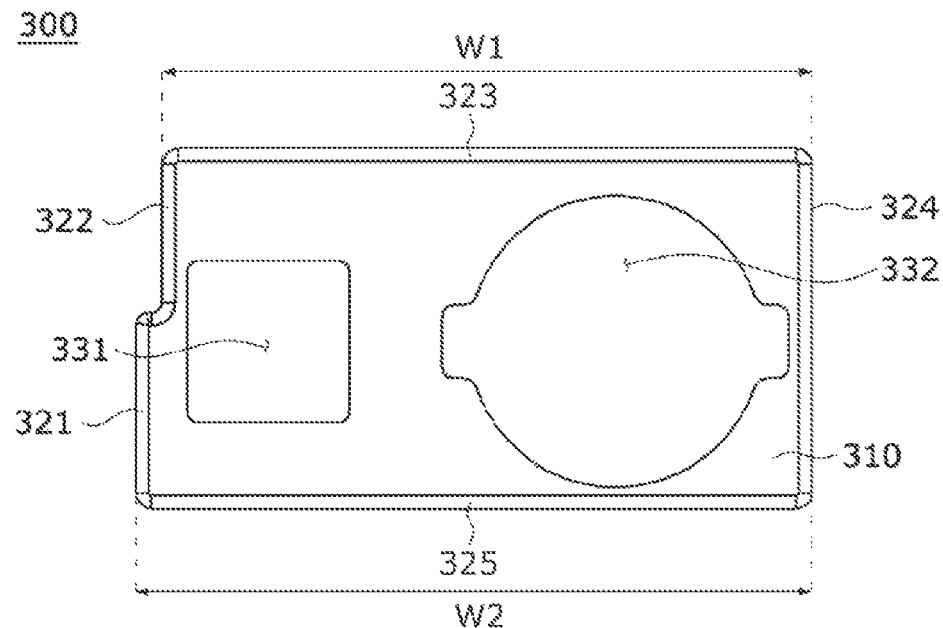
[FIG. 14]
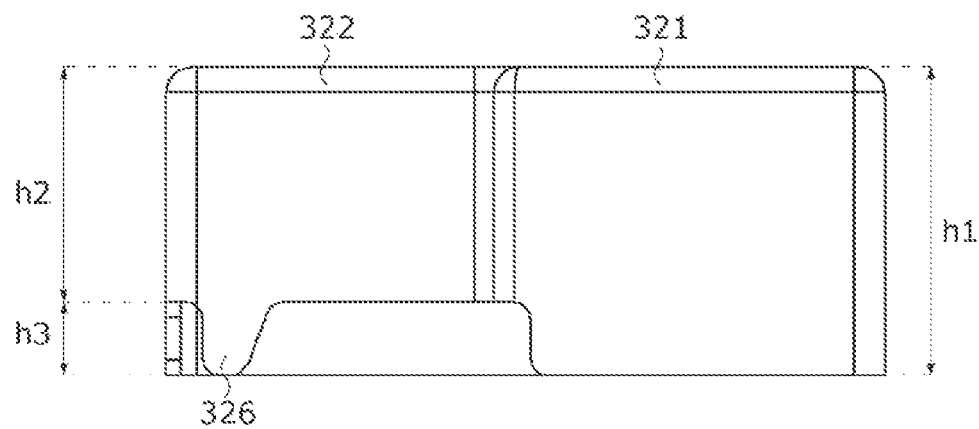

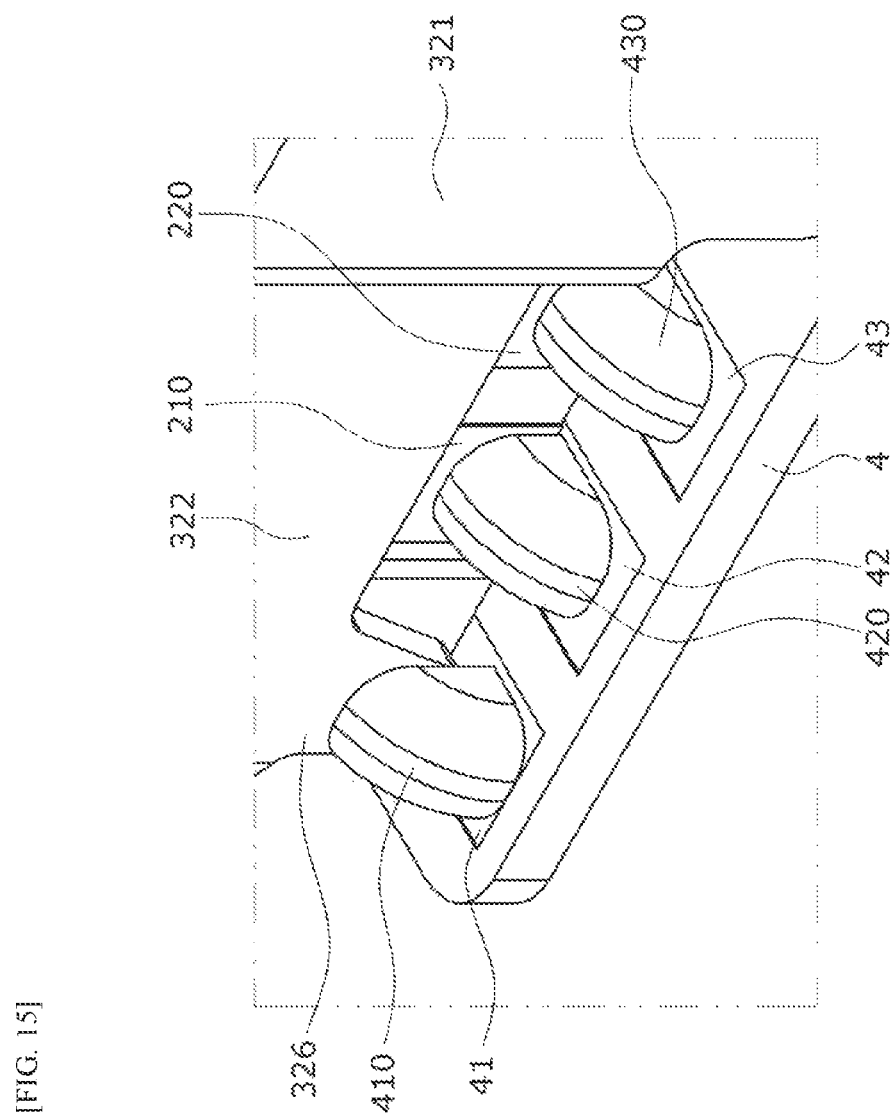
[FIG. 15]

CAMERA MODULE INCLUDING AN OPTICAL MEMBER

CROSS REFERENCE TO RELATED APPLICATIONS

This application is the National Phase of PCT International Application No. PCT/KR2021/001244, filed on Jan. 29, 2021, which claims priority under 35 U.S.C. 119(a) to Patent Application No. 10-2020-0010338, filed in the Republic of Korea on Jan. 29, 2020, all of which are hereby expressly incorporated by reference into the present application.

TECHNICAL FIELD

The present invention relates to a camera module.

BACKGROUND ART

Three-dimensional content is used in various fields such as education, manufacturing, autonomous driving, and the like in addition to the fields of games and culture, and in order to obtain three-dimensional content, a depth map is required. A depth map is a map showing a spatial distance and shows perspective information of one point with respect to another point in a two-dimensional image.

A time of flight (ToF) method has been drawing attention as a technology for obtaining a depth map. According to the ToF method, a flying time, that is, a time for which light is emitted, reflected, and returned, is measured to calculate a distance to an object. A big advantage of the ToF method is to quickly provide the information of a distance in a three-dimensional space in real time. In addition, a user may obtain accurate distance information without applying an additional algorithm or correction hardware-wise. In addition, even when a very close subject or a moving subject is measured, an accurate depth map can be obtained.

However, unlike a camera module which does not use a separate light source, since the ToF camera has a structure which emits light using a light source, there may be an unsafety problem. Particularly, when light with high intensity is emitted to a part sensitive to light such as eyes in the human body, a serious injury may occur. In order to prevent such accidents, ToF camera modules are manufactured according to strict safety regulations. Accordingly, a camera module which can solve such problems is required.

Technical Problem

The present invention is directed to providing a time of flight ToF) camera module.

Objectives to be achieved through embodiments are not limited thereto and include objectives and effects which may be recognized through the technical solution or embodiments described below.

Technical Solution

One aspect of the present invention provides a camera module including a circuit board, a light source and an image sensor disposed on the circuit board, a housing disposed on the circuit board, an optical member disposed above the light source and including an electrode, and a conductive unit which is disposed on the housing and electrically connects the electrode of the optical member and the circuit board.

The camera module may include a cover disposed on the housing, wherein the cover may be spaced apart from the conductive unit.

The conductive unit may include a first conductive unit and a second conductive unit.

Each of the first conductive unit and the second conductive unit may include a first part disposed on the housing, a second part extending from the first part, and a third part which extends from the second part and has a width greater than a width of the second part.

The second part may include a first sub-part extending along an upper surface of the housing and a second sub-part connected to the first sub-part and extending along a side surface of the housing.

The first sub-part of the first conductive unit may include a first piece and a second piece that is bent to be connected to the first piece.

The second part of the second conductive unit may be bent and extend from the third part of the second conductive unit.

The housing may include a first groove, and the conductive unit may be disposed in the first groove.

The first groove may include a first region and a second region, wherein the first conductive unit may be disposed in the first region of the first groove, and the second conductive unit may be disposed in the second region of the first groove.

A width of the first groove may be greater than a width of the conductive unit.

A depth of the first groove may be greater than a thickness of the conductive unit.

The housing may include a protruding portion protruding further than the conductive unit.

The housing may include a first hole positioned above the light source and a step portion disposed around the first hole, wherein the step portion may include a seating surface on which the optical member is disposed, The first region of the first groove may extend to a first corner portion of the seating surface, and the second region of the first groove may extend to a second corner portion of the seating surface.

The first conductive unit may be disposed to extend from the first groove to the first corner portion, and the second conductive unit may be disposed to extend from the first groove to the first corner portion.

The camera module may include a dummy electrode disposed between the optical member and the housing and spaced apart from the conductive unit.

The dummy electrode may include a first dummy electrode and a second dummy electrode, wherein the first dummy electrode may be disposed on a third corner portion of the seating surface, and the second dummy electrode may be disposed on a fourth corner portion of the seating surface.

Thicknesses of the first dummy electrode and the second dummy electrode may be the same as thicknesses of the first conductive unit and the second conductive unit.

The seating surface may include first to fourth seating surfaces disposed between the first to fourth corner portions, and the housing may include first to fourth connecting surfaces extending from the first to fourth seating surfaces to an upper end surface and a second groove disposed in at least one of the first to fourth seating surfaces and extending to at least one of the first to fourth connecting surfaces.

Another aspect of the present invention provides a camera module including a circuit board, a light source and an image sensor disposed on the circuit board, a housing disposed on the circuit board and including a first hole overlapping the light source, a cover disposed on the housing, an optical member disposed above the light source and disposed to overlap the first hole, and connecting electrodes disposed to extend from the first hole outward from the housing, wherein the connecting electrodes are spaced apart from the cover.

The housing may include a pattern portion having a concave shape in an upper end surface in contact with the cover.

The circuit board may include a first terminal connected to the cover, a second terminal connected to a first connecting electrode of the connecting electrodes, and a third terminal connected to a second connecting electrode of the connecting electrodes.

The cover may include a first side plate and a second side plate disposed on a first side surface, and a step max be formed between the first side plate and the second side plate so that the cover does not overlap upper portions of the first to third terminals.

A lower end portion of the first side plate may be disposed in contact with the circuit board, and a lower end portion of the second side plate may be disposed apart from the circuit board.

The cover may include a protruding portion which extends from the lower end portion of the first side plate and is in contact with the first terminal.

The camera module may include a first soldering portion which couples the protruding portion to the first terminal, a second soldering portion which couples the first connecting electrode to the second terminal, and a third soldering portion which couples the second connecting electrode to the third terminal.

The cover may include a concave portion disposed adjacent to one corner portion of corner portions of the circuit board in a plan view, and the first to third soldering portions may be disposed on the concave portion.

Still another aspect of the present invention provides a camera module including a circuit board, a light source and an image sensor disposed on the circuit board, a housing disposed on the circuit board and including a first hole overlapping the light source, an optical member disposed above the light source and disposed to overlap the first hole, a connecting electrode extending from the first hole outward from the housing, and a dummy electrode disposed around the first hole, wherein at least a part of the connecting electrode and at least a part of the dummy electrode are disposed between the optical member and the housing.

The housing may include a step portion disposed on an inner circumferential surface of the first hole, a part of the connecting electrode may be disposed on at least one of corner portions of the step portion, and the dummy electrode may be disposed on at least one corner portion, in which the part of the connecting electrode is not disposed, among the corner portions of the step portion.

A thickness of the dummy electrode may be the same as a thickness of the connecting electrode.

Advantageous Effects

According to embodiments, a time of flight (ToF) camera module with high safety can be provided.

A manufacturing process of the camera module can be simplified.

A defect rate of the camera module occurring when the camera module is manufactured can be reduced.

Various and useful advantages of the present invention are not limited thereto and may be more easily understood from the description of specific embodiments of the present invention.

DESCRIPTION OF DRAWINGS

FIG. 1 is a perspective view illustrating a camera module according to an embodiment of the present invention.

FIG. 2 is an exploded view illustrating the camera module according to the embodiment of the present invention.

FIG. 3 is a plan view illustrating a housing according to the embodiment of the present invention.

FIG. 4 is a rear view illustrating the housing according to the embodiment of the present invention.

FIG. 5 is a side view illustrating the housing according to the embodiment of the present invention.

FIG. 6 is an enlarged perspective view illustrating one side of the housing according to the embodiment of the present invention.

FIG. 7 is a cross-sectional view illustrating the housing according to the embodiment of the present invention, FIG. 8 is an enlarged plan view illustrating a step portion of the housing according to the embodiment of the present invention.

FIG. 9 is a view illustrating a first conductive unit according to the embodiment of the present invention.

FIG. 10 is a view illustrating a second conductive unit according to the embodiment of the present invention.

FIG. 11 is a plan view illustrating the housing in which conductive units, dummy electrodes, and an optical member according to the embodiment of the present invention are coupled.

FIG. 12 is a side view illustrating the housing in which the conductive units, the dummy electrodes, and the optical member according to the embodiment of the present invention are coupled.

FIG. 13 is a plan view illustrating a cover according to the embodiment of the present invention.

FIG. 14 is a side view illustrating the cover according to the embodiment of the present invention.

FIG. 15 is an enlarged view illustrating one side of the camera module according to the embodiment of the present invention.

MODES OF THE INVENTION

Hereinafter, exemplary embodiment of the present invention will be described in detail with reference the accompanying drawings.

However, the technical spirit of the present invention is not limited to some embodiments which will be described and may be embodied in a variety of different forms, and one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and the meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" may be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements, in addition, when one element is described as being formed "on or under" another element, such a description may include a case in which the one element is formed at an upper side or a lower side with respect to another element.

Hereinafter, an optical device according to the present embodiment will be described.

The optical device may include any one of a handphone, a portable phone, a smart phone, a portable smart device, a digital camera, a laptop computer, a digital broadcasting terminal, personal digital assistants (PDAs), a portable multimedia player (PMP), and a navigation device. However, the types of the optical device are not limited thereto, and any device for capturing an image may be included in the optical device.

The optical device may include a main body. The main body may have a bar shape. Alternatively, the main body may have one of various structures, such as a slide type, a folder type, a swing type, and a swivel type, in which two or more sub bodies are coupled to be relatively movable. The main body may include a case (a casing, a housing, and a cover) forming an exterior. For example, the main body may include a front case and a rear case. Various electronic components of the optical device may be installed in a space formed between the front case and the rear case.

The optical device may include a display. The display may be disposed on one surface of the main body of the optical device. The display may output an image. The display may output an image captured by a camera.

The optical device may include a camera. The camera may include a time of flight (ToF) camera device. The ToF camera device may include a camera device. The ToF camera device may include a camera module. The ToF camera device may be disposed on a front surface of the main body of the optical device. In this case, the ToF camera device may be used for various types of biometric recognition, such as user's face recognition and iris recognition, for security authentication of the optical device.

Hereinafter, the camera module according to the embodiment of the present invention will be described with reference to FIGS. 1 to 12.

FIG. 1 is a perspective view illustrating the camera module according to the embodiment of the present invention.

Referring to FIG. 1, the camera module according to the embodiment of the present invention may include a light emitting unit 1, a light receiving unit 2, a coupling unit 3, a circuit board 4, a second board 5, a connecting part 6, and a connector 7.

The light emitting unit 1 may be a light emitting module, a light emitting unit, a light emitting assembly, or a light emitting device. The light emitting unit 1 may generate an output light signal and emit the output light signal to an object. In this case, the light emitting unit 1 may generate and output the output light signal the form of a pulse wave or continuous wave. The continuous wave may have the form of a sinusoid wave or squared wave. Since the output light signal is generated as the form of the pulse wave or continuous wave, the ToF camera device may detect a phase difference between the output light signal output by the light emitting unit 1 and an input light signal reflected by the object and input to the light receiving unit 2 of the ToF camera device. In the present specification, output light may be light output by the light emitting unit 1 and incident on the object, and input light may be light which is input to the ToF camera device after the light is output by the light emitting unit 1, reaches the object, and is reflected by the object. Based on the object, the output light may be input light, and the input light may be output light. The light emitting unit 1 emits the generated output light signal for a predetermined integration time. In this case, the integration time means one frame cycle. In order to generate a plurality of frames, the preset integration time is repeated. For example, when the ToF camera device captures images of the object at 20 frames per second (FPS), the integration time is ½₀ [sec], In addition, in order to generate 100 frames, the integration time may be repeated 100 times.

The light emitting unit 1 may output a plurality of output light signals having different frequencies. The light emitting unit 1 may sequentially and repeatedly generate a plurality of output light signals having different frequencies. Alternatively, the light emitting unit 1 may also output a plurality of output light signals having different frequencies at the same time.

The camera module may include the light receiving unit 2. The light receiving unit 2 may be a light receiving module, a light receiving unit, a light receiving assembly, or a light receiving device. The light receiving unit 2 may detect light emitted by the light emitting unit 1 and reflected by the object. The light receiving unit 2 may generate an input light signal corresponding to the output light signal output by the light emitting unit 1. The light receiving unit 2 may be disposed parallel to the light emitting unit 1. The light receiving unit 2 may be disposed beside the light emitting unit 1, The light receiving unit 2 may be disposed in the same direction as the light emitting unit 1.

The camera module may include the circuit board 4. The circuit board 4 may include a printed circuit board (PCB), The light emitting unit 1 and the light receiving unit 2 may be disposed on the circuit board 4. The circuit board 4 may be electrically connected to the light emitting unit 1 and the light receiving unit 2.

The circuit board 4 may include a plurality of terminals at one side. The circuit board 4 may include a first terminal to a third terminal. The first terminal may be a terminal connected to a cover. The first terminal may be a ground terminal. The second terminal may be a terminal connected to a first conductive unit. The third terminal may be a terminal connected to a second conductive unit. The second terminal and the third terminal may be electrically connected to transparent electrodes through the first conductive unit and the second conductive unit.

The camera module may include the coupling unit 3. The coupling unit 3 may be electrically connected to the circuit board 4. The coupling unit 3 may be connected to components of the optical device. The coupling unit 3 may include the connector 7 connected to the components of the optical device. The coupling unit 3 may include the second board 5 on which the connector 7 is disposed and which is connected to the connecting part 6. The second board 5 may be a PCB.

The camera module may include the connecting part 6. The connecting part 6 may connect the circuit board 4 and the coupling unit 3. The connecting part 6 may have flexibility. The connecting part 6 may be a flexible PCB (FPCB).

FIG. 2 is an exploded view illustrating the camera module according to the embodiment of the present invention.

Referring to FIG. 2, the light emitting unit may include a light source 40 and an optical member 50.

The light emitting unit 1 may include the light source 40. The light source 40 may be disposed on the circuit board 4. The light source 40 may generate light. The light source 40 may output the light. The light source 40 may emit the light.

The light generated by the light source 40 may be infrared light with a wavelength of 770 to 3000 ma. Alternatively, the light generated by the light source 40 may be visible light with a wavelength of 380 to 770 nm. The light source 40 may include light emitting diodes (LEDs) or vertical cavity surface light emitting lasers (VCSELs). The light source 40 may include a plurality of LEDs or a plurality of VCSELs having a form arranged along a predetermined pattern. In addition, the light source 40 may include organic LEDs (OLEDs) or laser diodes (LDs).

The light emitting unit 1 may include the optical member 50. The optical member 50 may be a diffuser, a lens, a diffractive optical element (DOE), or a holographic optical element (HOE). The optical member 50 may be disposed in front of the light source 40. Light emitted by the light source 40 may pass through the optical member 50 and may be incident on the object. The optical member 50 may change a path of the light emitted by the light source 40. The optical member 50 may collect the light emitted by the light source 40. An electrode may be disposed on the optical member 50. The optical member 50 may include the electrode, or a separate electrode may be disposed. The electrode may be a transparent electrode.

The light emitting unit 1 may include a light modulation unit which modulates light. The light source 40 may generate an output light signal in the form of a pulse wave or continuous wave by repeatedly turning on/off the light source 40 at predetermined time intervals. The predetermined time intervals may correspond to a frequency of the output light signal. The turning on/off of the light source 40 may be controlled by the light modulation unit. The light modulation unit may control the turning on/off of the light source 40 so that the light source 40 generates an output light signal in the form of a continuous wave or a pulse wave. The light modulation unit may control the light source 40 to generate an output light signal in the form of a continuous wave or a pulse wave through frequency modulation, pulse modulation, or the like. The light modulation unit may be disposed on a board.

The light receiving unit may include a lens module 10, a filter 20, and a sensor 30.

The lens module 10 may transmit light reflected by the object. An optical axis of the lens module 10 and an optical axis of the sensor 30 may be aligned. The lens module 10 may be coupled to the housing 100. The lens module 10 may be fixed to the housing 100.

The filter 20 may be coupled to the housing 100. The filter 20 may disposed between the lens module 10 and the sensor 30. The filter 20 may be disposed on an optical path between the object and the sensor 30. The filter 20 may filter light in a predetermined wavelength band. The filter 20 may transmit light with specific wavelengths. That is, the filter 20 may block light with wavelengths excluding the specific wavelengths by reflecting or absorbing the light. The filter 20 may transmit infrared light and block light with wavelengths excluding wavelengths of the infrared light. Alternatively, the filter 20 may transmit visible light and block light with wavelengths excluding wavelengths of the visible light. The filter 20 may move. The filter 20 may integrally move with a holder. The filter 20 may be tilted. The filter 20 may move to adjust an optical path. The filter 20 may move to change a path of light incident on the sensor 30. The filter 20 may change an angle, direction, or the like of a field of view (FOV) of incident light.

The sensor 30 may detect light. The sensor 30 may detect the light and output an electric signal. The sensor 30 may detect light with a wavelength corresponding to a wavelength of light output by the light source 40. The sensor 30 may detect infrared light. Alternatively, the sensor 30 may detect visible light. The sensor 30 may be disposed on the circuit board 4. The sensor 30 may be an image sensor.

The sensor 30 may include a pixel array which receives light passing through the lens module 10 and converts the light into an electric signal corresponding to the light, a driving circuit which drives a plurality of pixels included in the pixel array, and a readout circuit which reads analog pixel signals of the pixels. The readout circuit may compare the analog pixel signals with a reference signal to perform analog-digital conversion so as to generate digital pixel signals (image signals). In this case, the digital pixel signals of the pixels included in the pixel array constitute the image signals, and since the image signals are transmitted in units of frames, the image signals may be defined as an image frame. That is, the sensor 30 may output a plurality of image frames.

The light receiving unit 2 may include an image synthesizing unit. The image synthesizing unit may include an image process which receives an image signal from the sensor 30 and processes (for example, performs interpolation, frame synthesizing, and the like on) the image signal. The image synthesizing unit may be disposed on a board but is not limited thereto. The image synthesizing unit may be implemented through an application processor (AP) of a terminal in which the camera module is disposed.

The camera module according to the embodiment of the present invention may include the housing 100, conductive units 210, dummy electrodes 220, a cover 300 and soldering portions 400.

The housing 100 may be disposed on a board. The housing 100 may be disposed on an upper surface of the board. The conductive units 210 and the dummy electrode 220 may be coupled to the housing 100. The optical member 50 may be coupled to the housing 100. The conductive units 210, the dummy electrodes 220, and the optical member 50 may be disposed to correspond to a first hole of the housing 100. The filter 20 may be coupled to the housing 100. The lens module 10 may be coupled to the housing 100. The filter 20 and the lens module 10 may be disposed to correspond to a second hole of the housing 100.

The housing 100 may include the first hole, the second hole, a step portion, and a first groove. The first hole may overlap the light source. The first hole may be disposed above the light source 40. The second hole may overlap the sensor 30. The second hole may be disposed above the sensor 30.

The step portion may be disposed adjacent to the first hole. The step portion may be disposed on an inner circumferential surface of the first hole. The step portion may support the optical member 50. The step portion may include seating surfaces on which the optical member 50 is disposed. The seating surfaces of the step portion may include first to fourth corner portions. The seating surfaces may include first to fourth seating surfaces disposed between the first to fourth corner portions. The housing 100 may include first to fourth connecting surfaces extending from the first to fourth seating surfaces.

The first groove may be connected to the step portion. The first groove may be connected to the corner portions of the step portion. The conductive units 210 may be disposed in the first groove. The first groove may be disposed in an upper surface of the housing 100 and may extend toward a side surface of the housing 100. A width of the first groove may be greater than a width of the conductive units 210. A depth of the first groove may be greater than a thickness of each of the conductive units 210.

The first groove may include a first region and a second region. The conductive unit 210 may be disposed in the first groove. The first conductive unit may be disposed in the first region of the first groove, and the second conductive unit may be disposed in the second region of the first groove. A protruding portion which protrudes further than the conductive units may be disposed between the first region and the second region of the first groove. The protruding portion may be disposed on the upper surface of the housing and may extend to the side surface of the housing. A length of a portion of the protruding portion disposed on the side surface of the housing may be smaller than a height of the side surface of the housing. Since the depth of the first groove is greater than the thickness of the conductive unit 210, damage to the conductive units 210 can be prevented during manufacturing.

The housing 100 may include a second groove. The housing 100 may include at least one second groove connected from at least one of the first to fourth connecting surfaces to a corresponding connecting surface. The second groove may be disposed in at least one seating surface among the first to fourth seating surfaces and may extend to one among the first to fourth connecting surfaces corresponding to at least one among the first to fourth seating surfaces. For example, when the second groove is disposed in the first seating surface, the second groove may extend to the first connecting surface corresponding to the first seating surface.

The housing 100 may include a pattern portion. The housing 100 may include the pattern portion formed in a concave shape in the upper surface in contact with the cover 300.

The conductive units 210 may electrically connect the transparent electrodes and the circuit board 4. The conductive units 210 may be formed of a conductor capable of connecting the transparent electrodes and the circuit board 4. In the present specification, the conductive units may be referred to as connecting electrodes.

The conductive units 210 may be disposed in the groove of the housing 100. A part of each of the conductive units 210 may be disposed in the first groove. A part of the conductive unit 210 may be disposed on the step portion of the housing 100. A part of the conductive unit 210 may be disposed on the corner portion of the seating surfaces of the step portion of the housing 100. A part of the conductive unit 210 may be disposed on at least one of the corner portions of the seating surfaces.

According to one embodiment, one conductive unit 210 may be provided, and a plurality of conductive units 210 may also be provided. The conductive units 210 may include the first conductive unit and the second conductive unit. The first conductive unit and the second conductive unit may electrically connect the transparent electrodes and the circuit board 4.

Each of the conductive units 210 may include a first part and a second part. Each of the first conductive unit and the second conductive unit may include the first part, the second part, and a third part. The first part is disposed on the housing. The second part extends from the first part. The second part includes a first sub-part and a second sub-part. The first sub-part is disposed on the upper surface of the housing. The first sub-part extends from the first part along the upper surface of the housing. The second sub-part is connected to the second sub-part. The second sub-part extends along the side surface of the housing. The third part extends from the second part. The third part is disposed on the side surface of the housing. A width of the second part is smaller than a width of the third part. That is, the width of the third part may be greater than the width of the second part.

The first part of the first conductive unit may be disposed on the first corner portion of the seating surfaces of the step portion.

The second part of the first conductive unit may be disposed on the first region of the first groove. The first sub-part and the second sub-part included in the second part of the first conductive unit may be disposed in the first region of the first groove.

The first sub-part of the first conductive unit is disposed in the first region of the first groove in the upper surface of the housing. The first sub-part of the first conductive unit includes a first piece and a second piece. The first piece extends from the first part. The first piece extends toward a short side of the housing. The second piece extends from the first piece. The second piece extends along a long side of the housing. Accordingly, the first piece and the second piece may be bent and connected.

The second sub-part of the first conductive unit is disposed in the first region of the first groove in the side surface of the housing. Since the first sub-part is disposed on the upper surface; and the second sub-part is disposed on the side surface, the first sub-part and the second sub-part may be bent at a connecting part. The second sub-part and the first sub-part may be bent at a predetermined curvature and connected.

The third part of the first conductive unit is disposed in the first region of the first groove in the side surface of the housing. The third part of the first conductive unit extends from the second part. The third part of the first conductive unit extends from the second sub-part. A width of the third part is greater than a width of the second part. When the third part extends from the second part, the third part may not be bent. That is, a center of the third part and a central line of the second part may match.

The first part of the second conductive unit may be disposed on the second corner portion of the seating surfaces of the step portion.

The second part of the second conductive unit may be disposed in the second region of the first groove. The first sub-part and the second sub-part included in the second part of the second conductive unit may be disposed in the second region of the first groove.

The first sub-part of the second conductive unit is disposed in the second region of the first groove in the upper surface of the housing. The second sub-part of the second conductive unit is disposed in the second region of the first groove in the side surface of the housing. Since the first sub-part is disposed on the upper surface, and the second sub-part is disposed on the side surface, the first sub-part and the second sub-part may be bent at a connecting part. The second sub-part and the first sub-part may be bent at a predetermined curvature and connected.

The third part of the second conductive unit is disposed in the second region of the first groove in the side surface of the housing. The third part of the second conductive unit extends from the second part. The third part of the second conductive unit extends from the second sub-part. A width of the third part is greater than a width of the second part. When the third part of the second conductive unit extends from the second part, the third part of the second conductive unit may be bent. That is, a center of the third part and a central line of the second part may not match.

The dummy electrodes 220 may be disposed adjacent to the first hole of the housing 100. The dummy electrodes 220 may be disposed on the step portion of the housing. The dummy electrodes 220 may be disposed on the corner portions of the seating portions of the step portion. The dummy electrodes 220 may be disposed on the corner portions, on which the conductive units are not disposed, among the corner portions of the seating portions of the step portion.

One or more dummy electrodes 220 may be provided. For example, when four corner portions of the seating portions of the step portion and one conductive unit 210 are provided, three dummy electrodes 220 may be provided. As another example, when four corner portions of the seating portions of the step portion and two conductive units 210 are provided, two dummy electrodes 220 may be provided. A thickness of each of the dummy electrodes 220 may be the same as the thickness of the conductive unit 210. Since the dummy electrode 220 is disposed on the corner portion of the step portion on which the conductive unit 210 is not disposed, a balance can be achieved when the optical member 50 is disposed.

The transparent electrodes may be coupled to the optical member 50. The transparent electrodes may be electrically connected to the optical member 50. The transparent electrodes may be disposed on a lower end portion of the optical member 50, The transparent electrodes may be formed in a shape according to a shape of the optical member 50 and formed in any shape in addition to the shape.

Each of the transparent electrodes may include a transparent conductive material in order to allow a current to flow without interfering with light transmission. The transparent electrode may include a material with a high conductivity and a light transmittance greater than or equal to a predetermined value. As an example, the transparent electrode may include an indium tin oxide film, an indium zinc oxide film, or an oxide such as zinc oxide. In addition, the transparent electrode may include a metal electrode (here, a metal includes at least one among Au, Ag, Al, Ti, and Cu) in the form of a mesh pattern having a line width of 10 μm or less, carbon nanotubes, silver nanowires, graphene, or nano meshes.

The transparent electrode may be electrically connected to the circuit board through one conductive unit. In this case, a capacitance of the transparent electrode may be detected in a self-capacitance measurement manner. In a normal state, the transparent electrode may have a predetermined capacitance $C_1$. Accordingly, the transparent electrode in the normal state may be charged with electric charges according to the predetermined capacitance $C_1$. Accordingly, a voltage or current detected through the transparent electrode in the normal state may correspond to the predetermined capacitance $C_1$. However, when the transparent electrode is damaged or the transparent electrode is separated from the conductive unit, the capacitance of the transparent electrode may change (for example, the capacitance C may be changed to a capacitance $C_2$). Accordingly, a voltage or current detected through the transparent electrode in an abnormal state (failure state) such as a damaged or separated state may correspond to the changed capacitance $C_2$. By detecting a change in voltage or current described above, whether the optical member is in the normal state may be checked. According to the embodiment, an output of the light source may be decreased, or the light source may be turned off according to a specific value of the voltage or current detected through the transparent electrode, a change in time, or a change in an integral value.

Alternatively, the transparent electrodes may be electrically connected to the circuit board through a plurality of conductive units. According to the embodiment, the transparent electrode may be electrically connected to the circuit board through the first conductive unit and the second conductive unit. Specifically, the transparent electrodes may include a first transparent electrode pattern and a second transparent electrode pattern which is electrically divided (opened) from the first transparent electrode pattern. When the first conductive unit electrically connects the first transparent electrode pattern and the circuit board, the second conductive unit electrically connects the second transparent electrode pattern and the circuit board, and a voltage or current is applied, a predetermined capacitance $C_2$ is formed between a first transparent electrode and a second transparent electrode and electric charges may be charged. In this case, a capacitance between the first transparent electrode pattern and the second transparent electrode pattern may be detected in a mutual capacitance measurement manner. When at least one of the first transparent electrode pattern and the second transparent electrode pattern is damaged, or at least one of the first transparent electrode and the second transparent electrode is separated from the first conductive unit or second conductive unit, a change in capacitance occurs (the capacitance $C_2$ is changed to a capacitance $C_2^-$), and a specific value of an output voltage or current, a change in time, or a change in integral value may be detected to check whether the optical member is in the normal state. In addition, even when the first conductive unit electrically connects the first transparent electrode pattern of the transparent electrode and the circuit board, and the second conductive unit electrically connects the second transparent electrode pattern of the transparent electrode and the circuit board, a change in capacitance may be detected in a self-capacitance manner.

In addition, a plurality of first transparent electrode patterns (first to $n^{th}$ patterns) and a plurality of second transparent electrode patterns (first to $n^{th}$ patterns) may be formed, and a plurality of first conductive units (first to $n^{th}$ electrodes) and a plurality of second conductive units (first to n$^{th}$ electrodes) may be formed so that the first transparent electrode patterns and the second transparent electrode patterns may be electrically connected to the first conductive units and the second conductive units, respectively. When a fine crack occurs in the optical member 50 and a partial region of the transparent electrode is damaged, a capacitance of the corresponding region may be changed, an output of the light source corresponding to the corresponding region is restricted, and a remaining portion may be operated normally.

In addition, one pattern of the transparent electrode may be electrically connected to the first conductive unit and the second conductive unit. Specifically, the board (the first terminal of the board), the first conductive unit, one pattern of the transparent electrode, the second conductive unit, and the board (the second terminal of the board) may be connected, and a current may flow to the transparent electrode. When the transparent electrode is damaged, or the transparent electrode is separated from at least one of the first conductive unit and the second conductive unit, since a change in a detected current occurs, whether the optical member 50 is in the normal state may be checked.

That is, since the transparent electrode and the circuit board are electrically connected, and whether a change in capacitance or current occurs is checked, damage to or failure of the optical member 50 can be checked, and an output of the light source can be controlled.

Light output by the light emitting unit is scattered through the optical member and the like to protect a subject. Light Output by the light emitting unit may be very dangerous when directly emitted to a part such as eyes which are sensitive to light. Accordingly, it is very important to detect whether the light emitting unit is damaged or failing. In the present invention, since light output can be controlled by detecting whether the optical member is damaged or failing through a change in capacitance or current of the transparent electrode, safety in use can be improved.

The cover 300 may be disposed on the circuit board 4, The cover 300 may be disposed on the housing 100, The cover 300 may be disposed to surround the housing 100. The cover 300 may accommodate the housing 100 therein. The cover 300 may form an exterior of the camera module. The cover 300 may be a non-magnetic cover. The cover 300 may be formed of a metal material. The cover 300 may be formed of a metal plate. The cover 300 may be electrically connected to a around portion of the circuit board 4. The cover 300 may be electrically connected to the first terminal which is the ground terminal of the circuit board 4. Accordingly, the cover 300 may be grounded. The cover 300 may block electromagnetic interference (EMI). In this case, the cover 300 may be referred to as an "EMI shield can." The cover 300 is a final assembled component and may protect the product from an external impact. The cover 300 may be formed of a material which is thin and strong.

Connection between the terminal formed on the circuit board 4 and the conductive unit 210 is fixed through the soldering portion 400. Connection between the terminal formed on the circuit board 4 and the cover 300 is fixed through the soldering portion 400.

Hereinafter, a structure of the housing will be specifically described with reference to FIGS. 3 to 8.

FIG. 3 is a plan view illustrating the housing according to the embodiment of the present invention. FIG. 4 is a rear view illustrating the housing according to the embodiment of the present invention, FIG. 5 is a side view illustrating the housing according to the embodiment of the present invention. FIG. 6 is an enlarged perspective view illustrating one side of the housing according to the embodiment of the present invention. FIG. 7 is a cross-sectional view illustrating the housing according to the embodiment of the present invention. FIG. 8 is an enlarged plan view illustrating the step portion of the housing according to the embodiment of the present invention.

The housing 100 may have a hexahedron shape having an open lower surface. The housing 100 may include an upper plate 101 and first to fifth side plates 106. The housing 100 may include the upper plate 101 including boles and first to fifth side plates 102 to 106 extending downward from an outer periphery or edge of the upper plate 101.

The upper plate 101 of the housing 100 may have a quadrangular shape. A step may be formed at one edge of the quadrangular upper plate 101 of the housing 100. The upper plate 101 of the housing 100 may include a first hole 110 and a second hole 120. The first hole 110 may have a quadrangular shape, and the second hole 120 may have a circular shape, but the present invention is not limited thereto. A width of the first hole 110 may be smaller than a width of the second hole 120 but is not limited thereto.

The first side plate 102 and the second side plate 103 may be disposed on one surface of the housing 100. Each of the second to fifth side plates 103 to 106 may be disposed on one surface among different surfaces. The first side plate 102 and the second side plate 103 may be disposed at a side opposite to the fourth side plate 105. The third side plate 104 may be disposed at a side opposite to the fifth side plate 106. For example, the first side plate 102 and the second side plate 103 may be disposed on a first side surface of the housing 100. The third side plate 104 may be disposed on a second side surface of the housing 100, The fourth side plate 105 may be disposed on a third side surface of the housing 100. The fifth side plate 106 may be disposed on a fourth side surface of the housing 100.

The first side plate 102 may be disposed adjacent to the fifth side plate 106 and the second side plate 103. The first side plate 102 may extend laterally from outer peripheries or edges of the second side plate 103 and the fifth side plate 106. The second side plate 103 may be disposed adjacent to the first side plate 102 and the third side plate 104. The second side plate 103 may extend laterally from outer peripheries or edges of the first side plate 102 and the third side plate 104. The first groove in which the conductive unit is disposed may be disposed on an outer surface of the second side plate 103. The third side plate 104 may be disposed adjacent to the second side plate 103 and the fourth side plate 105. The third side plate 104 may extend laterally from the outer periphery or edge of the second side plate 103 and an outer periphery or edge of the fourth side plate 105. The fourth side plate 105 may be disposed adjacent to the third side plate 104 and the fifth side plate 106. The fourth side plate 105 may extend laterally from the outer peripheries or edges of the third side plate 104 and the fifth side plate 106. The fifth side plate 106 may be disposed adjacent to the fourth side plate 105 and the first side plate 102. The fifth side plate 106 may extend laterally from the outer peripheries or edges of the fourth side plate 105 and the first side plate 102.

A length of the third side plate 104 and a length of the fifth side plate 106 may be different from each other. The length of the fifth side plate 106 may be greater than the length of the third side plate 104. Accordingly, a step may be formed between the first side plate 102 extending from the fifth side plate 106 and the second side plate 103 extending from the third side plate 104. Due to the step formed between the first side plate 102 and the second side plate 103, even when the housing 100 is coupled to the circuit board, the terminal coupled to the conductive unit may be exposed to the outside of the housing 100.

The upper plate 101 of the housing 100 may include a step portion 130 formed adjacent to the first hole 110, The step portion 130 may be formed to surround an inner circumferential surface of the first hole 110. The step portion 130 may include the seating surfaces. The seating surfaces of the step portion 130 may be disposed to form a step with respect to the upper surface of the housing 100. A length from a bottom surface to the upper surface of the housing 100 may be greater than a length from the bottom surface to the seating surfaces of the housing 100. The seating surfaces of the step portion 130 may include first to fourth corner portions 131 to 134. The first corner portion 131 may be disposed in a diagonal direction from the third corner portion 133. The second corner portion 132 may be disposed in a diagonal direction from the fourth corner portion 134. The seating surfaces of the step portion 130 may include first to fourth seating surfaces 135 to 138 disposed between the first to fourth corner portions 131 to 134. The first seating surface 135 may be disposed between the first corner portion 131 and the second corner portion 132. The second seating surface 136 may be disposed between the second corner portion 132 and the third corner portion 133. The third seating surface 137 may be disposed between the third corner portion 133 and the fourth corner portion 134. The fourth seating surface 138 may be disposed between the fourth corner portion 134 and the first corner portion 131. The first seating surface 135 may be disposed at a side opposite to the third seating surface 137. The second seating surface 136 may be disposed at a side opposite to the fourth seating surface 138.

The housing 100 may include first to fourth connecting surfaces 191 to 194 connected to the first to fourth seating surfaces 135 to 138. The first connecting surface 191 may be disposed adjacent to the first seating surface 135. The first connecting surface 191 may extend from an edge of the first seating surface 135. The second connecting surface 192 may be disposed adjacent to the second seating surface 136. The second connecting surface 192 may extend from an edge of the second seating surface 136. The third connecting surface 193 may be disposed adjacent to the third seating surface 137. The third connecting surface 193 may extend from an edge of the third seating surface 137. The fourth connecting surface 194 may be disposed adjacent to the fourth seating surface 138. The fourth connecting surface 194 may extend from an edge of the fourth seating surface 138.

The housing may include second grooves 139. At least one of the first to fourth seating surfaces 138 may include the second grooves 139. The second grooves 139 formed in at least one support surface among the first to fourth seating surfaces 138 may extend to the first to fourth connecting surfaces 194. The plurality of second grooves 139 may be provided. Referring to the drawings as an example, three second grooves 139 may be formed in the second seating surface 136. Three second grooves 139 may extend to the second connecting surface 192 extending from the second seating surface 136. Gas in the housing may be discharged to the outside through the second grooves 139. According to the embodiment, the optical member may be coupled to the step portion 130 by an adhesive. When the optical member is coupled by the adhesive, some of the adhesive may be evaporated by heat and introduced into the housing. When some of the evaporated adhesive is not discharged to the outside of the housing, there can be a problem that light output by the light source is distorted. However, in the present invention, since the evaporated adhesive can be discharged through the second groove 139, such a problem can be solved.

The housing 100 may include the first groove. The first groove may include a first region 140 and a second region 150.

The first region 140 of the first groove is disposed on the upper plate 101 of the housing 100. The first region 140 of the first groove extends to the side plate of the housing 100. The first region 140 of the first groove extends to the second side plate 103 of the housing 100. The first region 140 of the first groove is connected to the first corner portion 131 of the seating surfaces of the step portion 130, In the first region 140 of the first groove, a bent portion may be formed in the upper plate 101.

The second region 150 of the first groove is disposed in the upper plate 101 of the housing 100. The second region 150 of the first groove extends to the side plate of the housing 100. The second region 150 of the first groove extends to the second side plate 103 of the housing 100. The second region 150 of the first groove is connected to the second corner portion 132 of the seating surfaces of the step portion 130.

A protruding portion 145 may be disposed between the first region 140 of the first groove and the second region 150 of the first groove. The protruding portion 145 may be disposed on the upper surface of the housing. Accordingly, the first region 140 of the first groove and the second region 150 of the first groove may be spaced apart from each other by the protruding portion 145, The protruding portion 145 may extend from the upper surface to the side surface of the housing. Accordingly, the first region 140 of the first groove and the second region 150 of the first groove may be spaced apart from each other by the protruding portion 145. A length of a portion of the protruding portion 145 which extends to the side surface of the housing may be smaller than a height of the side plate. Accordingly, the first region 140 of the first groove and the second region 150 of the first groove may be spaced apart from each other at an upper portion of the side plate and connected to each other at a lower portion of the side plate. According to the embodiment, the first region 140 of the first groove and the second region 150 of the first groove may be spaced apart from each other at an upper portion of the second side plate 103 and connected to each other at a lower portion of the second side plate 103 of the housing 100. The protruding portion 145 may protrude further than the conductive units disposed on the housing.

The housing 100 may include a pattern portion 160 having a concave shape in the upper surface of the housing 100 in contact with the cover. The pattern portion 160 having the concave shape may be disposed in the upper plate 101 of the housing 100. Grooves having a concave shape may be formed in the upper plate 101 of the housing 100 along a predetermined pattern. Based on an uppermost end surface of the housing, the pattern portion 160 has the concave shape, but, based on bottom surfaces of the grooves having the concave shape, the pattern portion 160 may have a convex shape. The grooves having the concave shape may be disposed apart from each other at predetermined intervals. The housing 100 and the cover may be coupled by an adhesive. The adhesive may be applied on the upper surface of the housing 100, and the cover may be disposed after the adhesive is applied. In this case, some of the adhesive overflows in a process of arranging the cover, and thus a manufacturing defect can occur. However, in the present invention, the pattern portion 160 disposed in an upper surface of the cover accommodates the adhesive overflowing in the process of arranging the cover, and thus a defect occurring in the process of manufacturing the camera module can be prevented.

The housing 100 may include a third groove 170, The third groove 170 may be disposed in a lower end of the second side plate 103 of the housing 100. The housing 100 and the board may be coupled by an adhesive. The adhesive may be applied on lower end portions of the first side plate to the fifth side plate 106 of the housing 100. After the adhesive is applied, when the housing 100 is disposed on the board, some of the adhesive may overflow. Since the second side plate 103 of the side plates of the housing 100 is adjacent to a region in which the first to third terminals of the board are disposed, some of the overflowing adhesive may be applied on the first to third terminals of the board. When the adhesive is applied on the first to third terminals, a defect of the camera module can occur. However, since the third groove 170 is disposed in the lower end portion of the second side plate 103, the overflowing adhesive can be accommodated in the third groove 170. Accordingly, the overflowing adhesive can be prevented from being introduced into the first to third terminals of the board.

The housing 100 may include coupling protrusions. The housing 100 may include a first coupling protrusion 181 and a second coupling protrusion 182. The first coupling protrusion 181 and the second coupling protrusion 182 may be inserted into a first coupling hole and a second coupling hole formed in the board. In this case, an example of two coupling protrusions is illustrated, but one or three or more coupling protrusions may be provided.

Hereinafter, the forms in which the housing and the conductive units, the dummy electrodes, and the optical member will be described in detail with reference to FIGS. 9 to 12. FIG. 9 is a view illustrating the first conductive unit according to the embodiment of the present invention. FIG. 10 is a view illustrating the second conductive unit according to the embodiment of the present invention. FIG. 11 is plan view illustrating the housing in which the conductive units, the dummy electrodes, and the optical member according to the embodiment of the present invention are coupled, FIG. 12 is a side view illustrating the housing in which the conductive units, the dummy electrodes, and the optical member according to the embodiment of the present invention are coupled.

Referring to FIG. 9, a first conductive unit 211 may include first to third parts 212 to 214. In addition, the second part 213 of the first conductive unit 211 may include a first sub-part 213-1 and a second sub-part 213-2. In addition, a first sub part 213-1 of the first conductive unit 211 may include a first piece 213-11 and a second piece 213-12.

As illustrated in FIGS. 11 and 12, the first conductive unit 211 is disposed on the first corner portion of the step portion and in the first region 140 of the first groove of the housing.

The first part 212 of the first conductive unit 211 is disposed on the first corner portion of the step portion.

A shape of the first part 212 when viewed from above may be the same as a shape of the first corner portion when viewed from above.

The first part 212 is connected to the second part 213. That is, the first part 212 may extend from the second part 213.

The second part 213 of the first conductive unit 211 is disposed along the first region 140 of the first groove.

Since the second part 213 is disposed along the first region 140 of the first groove, a bent portion may be formed along the first region 140 of the first groove. First, the first sub-part 213-1 of the first conductive unit 211 is disposed in the first region 140 of the first groove formed in an upper portion of the housing, and the second sub-part 213-2 of the first conductive unit 211 is disposed in the first region 140 of the first groove formed in the side surface of the housing. Accordingly, the first sub-part 213-1 and the second sub-part 213-2 may be bent and extend from each other. The first sub-part 213-1 and the second sub-part 213-2 may be bent at a predetermined curvature and extend. In addition, since the bent portion is formed in the first region 140 of the first groove formed in the upper portion of the housing, the second sub-part 213-1 may be formed to be bent. In the second sub-part 213-1, the first piece 213-11 and the second piece 213-12 may be bent to be connected to each other. In the drawing, the first piece 213-11 and the second piece 213-12 are perpendicular to each other in longitudinal directions but this is only exemplary. The longitudinal directions of the first piece 213-11 and the second piece 213-12 may also form a predetermined angle other than 90 degrees. Since the step portion of the housing is formed at a lower position than the upper surface of the housing, an inclination may be formed in the first region 140 of the first groove extending from the first corner portion of the step portion. Accordingly, the first piece 213-11 may be formed to be bent along a corresponding inclined surface.

A width of the second part 213 may be smaller than a width of the first region 140 of the first groove. Accordingly, the second part 213 may be disposed apart from the first region 140 of the first groove. A thickness of the second part 213 may be smaller than a depth of the first region 140 of the first groove. Accordingly, even when the cover is installed on the housing, the second part 213 may be spaced apart from the cover.

The second part 213 may be disposed between and connected to first part 212 and the third part 214, The second part 213 may extend from the first part 212 and the third part 214.

The third part 214 of the first conductive unit 211 is disposed along the first region 140 of the first groove. The third part 214 is disposed in the first region 140 of the first groove disposed in the side surface of the housing.

A width of the third part 214 may be greater than a width of the second part 213. Accordingly, stability of electrical coupling between the terminal formed on the circuit board and the first conductive unit 211 can be improved. A thickness of the third part may be smaller than the depth of the first region 140 of the first groove. Accordingly, even when the cover is installed on the housing, the third part 214 may be spaced apart from the cover.

The third part 214 extends from the second part 213. The third part 214 extends from the second sub-part 213-2.

Referring to FIG. 10, a second conductive unit 215 may include first to third parts 216 to 218. In addition, the second part 217 of the second conductive unit 215 may include a first sub-part 217-1 and a second sub-part 217-2.

As illustrated in FIGS. 11 and 12, the second conductive unit 215 is disposed in the second corner portion of the step portion and the second region 150 of the first groove of the housing.

The first part 216 of the second conductive unit 215 is disposed on the second corner portion of the step portion.

A shape of the first part 216 when viewed from above may be the same as a shape of the second corner portion when viewed from above.

The first part 216 is connected to the second part 217. That is, the first part 216 may extend from the second part 217.

The second part 217 of the second conductive unit 215 is disposed along the second region 150 of the first groove.

Since the second part 217 is disposed along the second region 150 of the first groove, a bent portion may be formed along the second region 150 of the first groove. The first sub-part 217-1 of the second conductive unit 215 is disposed in the second region 150 of the first groove formed in the upper portion of the housing, and the second sub-part 217-2 of the second conductive unit 215 is disposed in the second region 150 of the first groove formed in the side surface of the housing. Accordingly, the first sub-part 217-1 and the second sub-part 217-2 may be bent and extend from each other. The first sub-part 217-1 and the second sub-part 217-2 may be bent at a predetermined curvature and extend. Since the step portion of housing is positioned at a lower position than the upper surface of the housing, an inclination may be formed in the second region 150 of the first groove extending from the second corner portion of the step portion. Accordingly, the first sub-part 217-1 may be formed to be bent along a corresponding inclined surface.

A width of the second part 217 may be smaller than a width of the second region 150 of the first groove. Accordingly, the second part 217 may be disposed apart from the second region 150 of the first groove. A thickness of the second part 217 may be smaller than a depth of the second region 150 of the first groove. Accordingly, even when the cover is installed on the housing, the second part 217 may be spaced apart from the cover.

The second part 217 may be disposed between and connected to the first part 216 and the third part 218. The second part 217 may extend from the first part 216 and the third part 218.

The third part 218 of the second conductive unit 215 is disposed along the second region 150 of the first groove. The third part 218 is disposed in the second region 150 of the first groove disposed in the side surface of the housing.

A width of the third part 218 may be greater than a width of the second part 217. Accordingly, stability of electrical connection between the terminal formed on the circuit board and the second conductive unit 215 can be improved. A thickness of the third part may be smaller than the depth of the second region 150 of the first groove. Accordingly, even when the cover is installed on the housing, the third part 218 may be spaced apart from the cover.

The third part 218 extends from the second part 217. The third part 218 extends from the second sub-part 217-2. The third part 218 may be bent and extend from the second part 217.

A first dummy electrode 221 is disposed on the third corner portion disposed in the diagonal direction from the first corner portion of the step portion. A second dummy electrode 222 is disposed on the fourth corner portion disposed in the diagonal direction from the second corner portion of the step portion. In addition, the transparent electrodes are disposed above the first conductive unit 211, the second conductive unit 215, the first dummy electrode 221, and the second dummy electrode 222.

Thicknesses of the first dummy electrode 221 and the second dummy electrode 222 may be the same as the thicknesses of the first conductive unit 211 and the second conductive unit 215. The thicknesses of the first dummy electrode 221 and the second dummy electrode 222 may be the same as thicknesses of the first part 212 of the first conductive unit 211 and the first part 216 of the second conductive unit 215. Since the thicknesses of the first conductive unit 211, the second conductive unit 215, the first dummy electrode 221, and the second dummy electrode 222 are the same, the optical member 50 disposed thereon may maintain balance. In this case, the thickness may be a length in a direction perpendicular to the upper surface of the housing.

The transparent electrodes may be coupled to the optical member 50 and disposed above the first conductive unit 211, the second conductive unit 215, the first dummy electrode 221, and the fourth dummy electrode 222. The transparent electrodes may be coupled to the optical member 50 and disposed above the first to fourth seating surfaces 135 to 138 of the step portion.

Hereinafter, the cover according to the embodiment of the present invention will be described in detail with reference to FIGS. 13 and 14. FIG. 13 is a plan view illustrating the cover according to the embodiment of the present invention. FIG. 14 is a side view illustrating the cover according to the embodiment of the present invention.

The cover 300 may have a hexahedron shape having an open lower surface. The cover 300 may include an upper plate 310 and first to fifth side plates 325. The cover 300 may include the upper plate 310 including holes and the first to fifth side plates 321 to 325 extending downward from an outer periphery or edge of the upper plate 310.

The upper plate 310 may have a quadrangular shape. A step may be formed at one edge of the quadrangular shape of the upper plate 310, The upper plate 310 may include a first hole 331 and a second hole 332. The first hole 331 may have a quadrangular shape, and a second hole 332 may have a circular shape, but the present invention is not limited thereto. A width of the first hole 331 may be smaller than a width of the second hole 332 but is not limited thereto.

The first side plate 321 and the second side plate 322 may be disposed on one surface of the cover 300. Each of the second to fifth side plates 322 to 325 may be disposed on one surface among different surfaces. The first side plate 321 and the second side plate 322 may be disposed at a side opposite to the fourth side plate 324. The third side plate 323 may be disposed at a side opposite to the fifth side plate 325. For example, the first side plate 321 and the second side plate 322 may be disposed on a first side surface of the cover 300. The third side plate 323 may be disposed on a second side surface of the cover 300. The fourth side plate 324 may be disposed on a third side surface of the cover 300. The fifth side plate 325 may be disposed on a fourth side surface of the cover 300.

The first side plate 321 may be disposed adjacent to the fifth side plate 325 and the second side plate 322. The first side plate 321 may extend laterally from outer peripheries or edges of the second side plate 322 and the fifth side plate 325. The second side plate 322 may be disposed adjacent to the first side plate 321 and the third side plate 323. The second side plate 322 may extend laterally from outer peripheries or edges of the first side plate 321 and the third side plate 323. The third side plate 323 may be disposed adjacent to the second side plate 322 and the fourth side plate 324. The third side plate 323 may extend laterally from the outer periphery or edge of the second side plate 322 and an outer periphery or edge of the fourth side plate 324. The fourth side plate 324 may be disposed adjacent to the third side plate 323 and the fifth side plate 325. The fourth side plate 324 may extend laterally from the outer peripheries or edges of the third side plate 323 and the fifth side plate 325, The fifth side plate 325 may be disposed adjacent to the fourth side plate 324 and the first side plate 321, The fifth side plate 325 may extend laterally from the outer peripheries or edges of the fourth side plate 324 and the first side plate 321.

The first side plate 321 and the second side plate 322 may have different heights. A height h1 of the first side plate 321 may be greater than a height h2 of the second side plate 322. Accordingly, the first side plate 321 may be spaced a predetermined distance h3 from the board.

A width w1 of the third side plate 323 may be smaller than a width w2 of the fifth side plate 325. Accordingly, in a plan view of the cover 300, a step having a predetermined width (width w2−width w1) may be formed between the first side plate 321 and the second side plate 322. In the plan view of the cover 300, the cover 300 may include the step having the predetermined width (width w2−width w1) and a concave portion in the second side plate 322. The concave portion of the cover 300 may be disposed adjacent to one corner of the circuit board 4. The concave portion of the cover 300 may correspond to the second side plate 322 and a protruding portion 326 which will be described below. A single concave portion of the cover 300 may be provided as illustrated, or a plurality of concave portions of the cover 300 may be provided. When the single concave portion of the cover 300 is provided, since a portion in which the cover 300 is bent may be minimized in the plan view, processability and physical reliability of cover 300 can be improved.

The cover 300 may include the protruding portion 326 disposed on the lower end of the second side plate 322. In the lower end portion of the second side plate 322, the protruding portion 326 may extend from a region corresponding to the first terminal of the circuit board. A value of a height of the protruding portion 326 may be the same as a value obtained by subtracting the height h2 of the first side plate 321 from the height h1 of the second side plate 322. Accordingly, the protruding portion 326 may be in contact with the first terminal of the circuit board. A left side and a right side of the protruding portion 326 may be open. A width of a lower end of the protruding portion 326, that is, a portion in contact with the first terminal of the circuit board may be smaller than a width of the first terminal of the circuit board.

FIG. 15 is an enlarged view illustrating one side of the camera module according to the embodiment of the present invention.

In a state in which the housing and the cover 300 are disposed on the circuit board 4, first to third soldering portions 430 may be disposed. The first soldering portion 410 may be disposed on a first terminal 41 of the circuit board 4 and the protruding portion 326 of the cover 300. Connection between the first terminal 41 of the circuit board 4 and the protruding portion 326 of the circuit board 4 may be maintained through the first soldering portion 410. The second soldering portion 420 may be disposed on a second terminal 42 of the circuit board 4 and the first conductive unit 211. Connection between the second terminal 42 of the circuit board 4 and the first conductive unit 211 may be maintained through the second soldering portion 420. The third soldering portion 430 may be disposed on a third terminal 43 of the circuit board 4 and the second conductive unit 215. Contact between the third terminal 43 of the circuit board 4 and the second conductive unit 215 may be maintained through the third soldering portion 430.

The first to third terminals 41 to 43 may be disposed at one side of the circuit board 4. The first to third terminals 41 to 43 may be disposed adjacent to any one edge of the circuit board 4. For example, when an upper surface of the circuit board 4 has a quadrangular shape, the first to third terminals 41 to 43 may be disposed adjacent to any one of two long sides and two short sides. The first to third terminals 41 to 43 may be disposed adjacent to any one corner portion of the circuit board 4. For example, when the upper surface of the circuit board 4 has a rectangular shape, the first to third terminals 41 to 43 may be disposed adjacent to any one corner portion among four corner portions. The first to third terminals 41 to 43 may be electrically divided from each other. The first to third terminals 41 to 43 may be structurally spaced apart from each other.

The first to third soldering portions 430 may be disposed in a state in which the housing on the circuit board 4 is coupled to the circuit board 4. That is, the first to third soldering portions 430 are disposed outside the housing. The cover 300 may include a groove through which a part of the housing is exposed when coupled to the housing. The groove may be disposed between the protruding portion 326 and the first side plate 321. The groove may expose at least one of the first conductive unit and the second conductive unit disposed on the housing. Such a structure has an advantage that a process of connecting the conductive units exposed through the groove and the terminals and a process of connecting the protruding portion 326 of the cover 300 and the terminal of the circuit board 4 can be performed at the same time.

According to the embodiment of the present invention, since the second side plate 322 of the cover is spaced apart from an upper end of the circuit board 4, even after both the housing and the cover 300 are coupled to the upper end of the circuit board 4, the second soldering portion 420 and the third soldering portion 430 may be disposed. Since the first soldering portion to the third soldering portion 430 are disposed in one process, there may be advantages that a manufacturing process can become simple, and a process time and a process cost can be reduced. In addition, since a protruding portion or a bent portion of the circuit board can be minimized, the processability of the circuit board can be improved, and durability can be maintained.

Although embodiments of the present invention have been described in detail with reference to the accompanying drawings, it will be understood by those skilled in the art that the invention may be performed in different concrete forms without changing the technological scope and essential features. Therefore, the above-described embodiments should be considered as only examples in all aspects and not for purposes of limitation.

The invention claimed is:

1. A camera module comprising:
   a circuit board;
   a light source and an image sensor disposed on the circuit board;
   a housing disposed on the circuit board;
   an optical member disposed above the light source and including an electrode separate from the light source; and
   a conductive unit which is disposed on the housing and electrically connects the electrode of the optical member and the circuit board.

2. The camera module of claim 1, comprising a cover disposed on the housing,
   wherein the cover is spaced apart from the conductive unit.

3. The camera module of claim 1, wherein the conductive unit includes:
   a first conductive unit; and
   a second conductive unit, and
   wherein each of the first conductive unit and the second conductive unit includes:
   a first part disposed on the housing;
   a second part extending from the first part; and a third part which extends from the second part and has a width greater than a width of the second part.

4. The camera module of claim 3, wherein the second part includes:
a first sub-part extending along an upper surface of the housing; and
a second sub-part connected to the first sub-part and extending along a side surface of the housing.

5. The camera module of claim 4, wherein the first sub-part of the first conductive unit includes:
a first piece; and
a second piece that is bent to be connected to the first piece,
wherein the second part of the second conductive unit is bent and extends from the third part of the second conductive unit.

6. The camera module of claim 5, wherein the housing includes a first groove; and
wherein the conductive unit is disposed in the first groove.

7. The camera module of claim 6, wherein the first groove includes:
a first region; and
a second region,
wherein the first conductive unit is disposed in the first region of the first groove, and
wherein the second conductive unit is disposed in the second region of the first groove.

8. The camera module of claim 7, wherein a width of the first groove is greater than a width of the conductive unit or a depth of the first groove is greater than a thickness of the conductive unit.

9. The camera module of claim 7, wherein the housing includes a protruding portion protruding further than the conductive unit.

10. The camera module of claim 7, wherein the housing includes:
a first hole positioned above the light source; and
a step portion disposed around the first hole, and
wherein the step portion includes a seating surface on which the optical member is disposed.

11. The camera module of claim 10, wherein the first region of the first groove extends to a first corner portion of the seating surface, and
wherein the second region of the first groove extends to a second corner portion of the seating surface.

12. The camera module of claim 11, wherein the first conductive unit is disposed to extend from the first groove to the first corner portion, and
wherein the second conductive unit is disposed to extend from the first groove to the first corner portion.

13. The camera module of claim 12, comprising a dummy electrode disposed between the optical member and the housing and spaced apart from the conductive unit.

14. The camera module of claim 13, wherein the dummy electrode includes:
a first dummy electrode; and
a second dummy electrode,
wherein the first dummy electrode is disposed on a third corner portion of the seating surface, and
wherein the second dummy electrode is disposed on a fourth corner portion of the seating surface.

15. The camera module of claim 14, wherein thicknesses of the first dummy electrode and the second dummy electrode are the same as thicknesses of the first conductive unit and the second conductive unit.

16. The camera module of claim 15, wherein the seating surface includes first to fourth seating surfaces disposed between the first to fourth corner portions, and
wherein the housing includes first to fourth connecting surfaces extending from the first to fourth seating surfaces to an upper end surface and a second groove disposed in at least one of the first to fourth seating surfaces and extending to at least one of the first to fourth connecting surfaces.

17. A camera module comprising:
a circuit board;
a light source and an image sensor disposed on the circuit board;
a housing disposed on the circuit board and including a first hole overlapping the light source;
a cover disposed on the housing;
an optical member disposed above the light source and disposed to overlap the first hole; and
connecting electrodes disposed to extend from the first hole outward from the housing,
wherein the connecting electrodes are spaced apart from the cover.

18. The camera module of claim 17, wherein the housing includes a pattern portion having a concave shape in an upper end surface in contact with the cover.

19. A camera module comprising:
a circuit board;
a light source and an image sensor disposed on the circuit board;
a housing disposed on the circuit board and including a first hole overlapping the light source;
an optical member disposed above the light source and disposed to overlap the first hole;
a connecting electrode extending from the first hole outward from the housing; and
a dummy electrode disposed around the first hole,
wherein at least a part of the connecting electrode and at least a part of the dummy electrode are disposed between the optical member and the housing.

20. The camera module of claim 19, wherein the housing includes a step portion disposed on an inner circumferential surface of the first hole,
wherein a part of the connecting electrode is disposed on at least one of corner portions of the step portion and
wherein the dummy electrode is disposed on at least one corner portion, in which the part of the connecting electrode is not disposed, among the corner portions of the step portion.

* * * * *